Patented Sept. 5, 1944

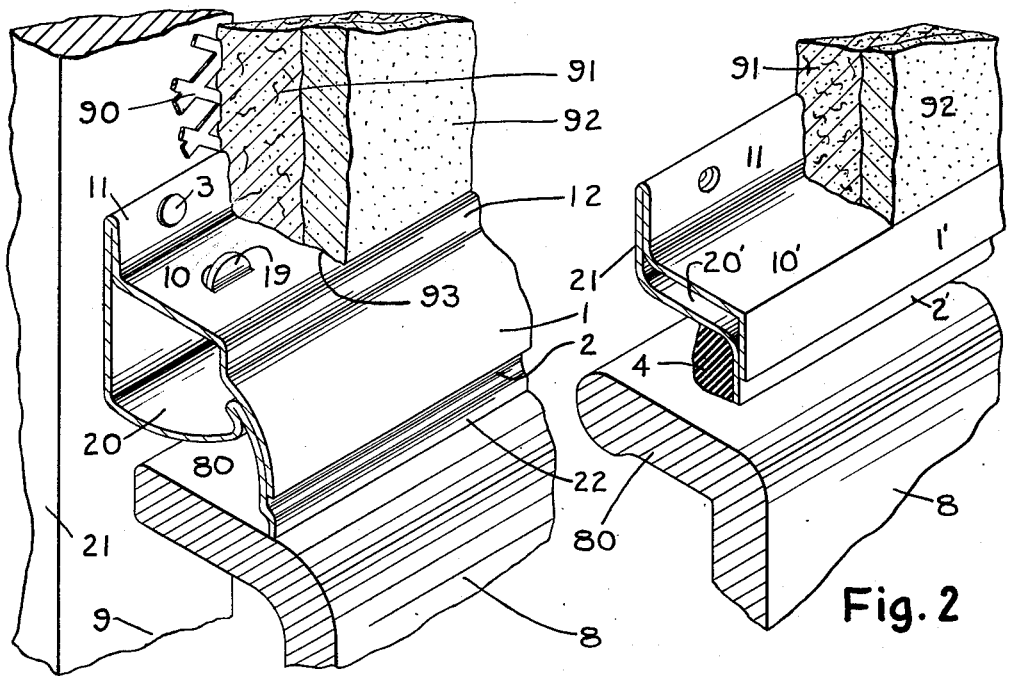
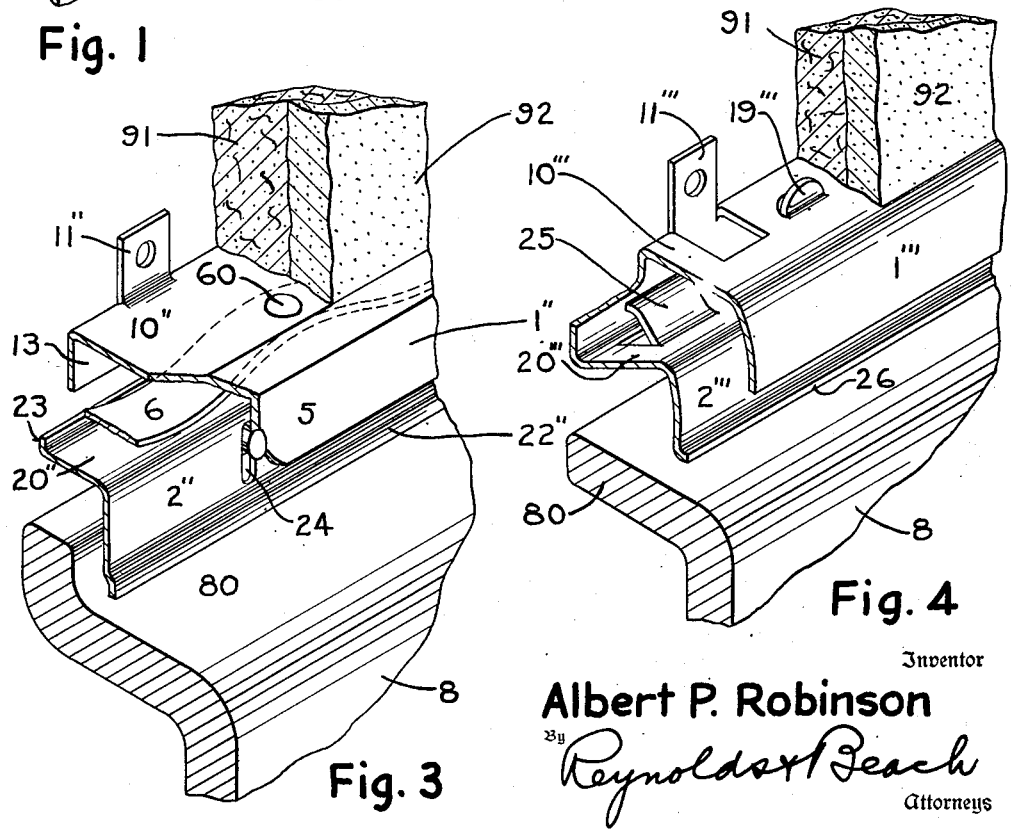

2,357,688

UNITED STATES PATENT OFFICE 2,357,688

SELF-CLOSING SEAL OR JOINT

Albert P. Robinson, near Seattle, Wash.

Application April 30, 1940, Serial No. 332,518

13 Claims. (Cl. 72—0.5)

The present invention relates to a device for sealing and keeping closed the joint between a terminal edge of a wall finish, for instance plaster or tile, and a member such as a bathtub or a sink which adjoins and underlies the edge of the wall finish, notwithstanding the tendency to separation which occurs in most houses, and which arises from such causes as shrinkage, settlement, and the like. Indeed, while a tub has been mentioned, the present invention may serve also to maintain a tight joint at the juncture between a wall and the floor, or similar surfaces forming part of the structure itself, rather than an installed fixture. Likewise, while in the instances above the joint would be horizontal, it may serve to seal joints which are other than horizontal. The invention is intended, in this specification to be understood in the generic sense, although for convenience of description it will be described as applied in the one specific instance, between a tile or plaster wall finish and the rim flange of a tub. Such a joint is one of the most difficult to keep tight, in residences, and is one which causes no little trouble and expense if it is not kept tight.

One of the objects of the present invention is to provide such a seal which can be simply and inexpensively made, for a seal which greatly or even materially increases the cost of installation will not, for that reason, be widely used.

A further object is to provide such a seal which automatically, and throughout the life of the building, will keep a tight joint, and which will yet not, within itself, show a distinctive line of demarcation, or open joint. The joint as a whole may be decorative, and in that sense noticeable, but should avoid the appearance of two separable parts.

Still a further object is to provide such a seal which, when used in places where collection and condensation of moisture is likely, will not admit moisture, but to the contrary will tend rather to obstruct the entrance of moisture, and will permit moisture to drain from its interior.

With these and other similar or related objects in mind the invention comprises the novel parts, and the novel combination and relative arrangement thereof, as shown in the accompanying drawing in several illustrative forms, and as will be described in this specification, and more particularly defined by the claims which terminate the same.

Figure 1 is a perspective view, showing the seal in association with a stud and other wall elements, and in conjunction with a tub, and illustrating the form which at present is most preferred.

Figure 2 is a similar view illustrating a modified and somewhat simplified arrangement.

Figure 3 is a similar view, showing a further modification, employing a definite spring means other than the resilience of the materials employed, and Figure 4 is a further modification somewhat similar in its nature to the forms of Figures 1 and 2, but incorporating self-attached spring means.

Tile or plaster walls in bathrooms must join the rim flange of the tub, and normally rest upon the rim flange when originally installed. As settlement or shrinkage occurs, great difficulty is encountered in keeping tight the joint between the lower edge of the tile and the rim of the tub. The tub is heavy, and causes some settlement, and as the studding and other parts of the structure dry out, shrinkage occurs. Almost invariably separation commences along the joint between the plaster or tile wall and the rim of the tub. If the wall finish is tile an open joint is left, and tile above it may come loose. If the wall finish is plaster, painted, water is absorbed by the plaster, paint blisters form, and the plaster eventually comes off. To repair such loose joints, or the eventual consequences thereof, requires expensive work by highly skilled mechanics, and further shrinkage or settlement, or in some instances expansion, makes it necessary to do the work over again at intervals. If such work is not done as often as required, moisture condenses and water leaks in, with the consequences noted above, and further damage is caused to the wall structure behind the tile and the tub. Such moist closed spaces afford excellent breeding places for insects, such as silverfish. In addition any such crack is unsightly.

Usually a structure which has a tile wall, or indeed a structure which has only a simple painted plaster finish above the tub, is required to present a neat, pleasing appearance, hence any seal which can be employed should be of pleasing appearance, and yet it must be inexpensive. In a device constructed according to the present invention the seal may be formed to simulate a screed, a ground, or other flush guide or gauge, or it may simulate a molding or finish strip. Various suggested forms are shown in the drawing, and various others will naturally suggest themselves. As to the exterior form, the invention is susceptible of incorporation in various possible forms, and no one of these exterior forms, unless particularly specified below, is essential or important, insofar as my invention is concerned.

In Figure 1 a stud 9 is shown, upon which lath, such as the metal lath 90, is applied for the support of the rough plaster coat 91 and the finish plaster coat or tile 92. These wall finish materials 91 and 92 may be considered together as the wall finish, and indeed the wall finish may be made of any suitable material. The tub's rim 80 extends into the wall beneath the lower terminal edge 93 of the wall finish, and may engage the stud 9.

According to the present invention, and contrary to common practice, there is purposely left an appreciable space between the lower terminal edge 93 of the wall finish and the rim 80 of the tub, which space is filled with a seal. This seal is made up, in the form shown in Figure 1, of a single strip of sheet metal, preferably somewhat resilient, and folded in a particular fashion. This includes a generally horizontal portion 10, and spaced therebelow a second generally horizontal portion 20. At the forward edge of each, that is to say, the edge which is substantially flush with the face of the wall finish, these two portions 10 and 20 are flanged downwardly to form the generally upright flanges 1 and 2. The flange 2 underlies the flange 1, and the two flanges lie in face-to-face relationship, yet are capable of relative vertical movement. In the form shown in Figure 1, wherein both the members 10 and 20 and their flanges 1 and 2 are part of a single sheet metal strip, there is formed a rear upright nailing flange 21 upon the portion 20, and a similar flange 11 on the portion 10, the material of the strip being sharply bent so that the nailing flanges 11 and 21 lie closely adjacent one another, upstanding slightly above the portion 10 to provide a convenient flange through which nails 3, or equivalent nailing elements, such as screws, rivets or staples may be driven into the studs 9 to support the seal as a whole.

Various types of resilient means may be utilized for urging flanges 1 and 2 continuously to slide relatively edgewise, for projecting the inner flange farther beyond the outer flange into firm contact with the tub rim, as will be described hereafter, and preferably such means also produce a resilient component transverse to the flanges, acting always in a direction to press them into contiguous face-to-face contact. In Figure 1 the horizontal portion 20 is resilient, and the lower edge of the upright flange 2 rests upon the rim of the tub, and at its initial installation the entire strip is pressed downwardly, to an extent such that the flange 2 is forced upwardly with relation to the flange 1, and the flange 1 is thereby pressed upwardly against the terminal edge 93. In effect the flange 2 is hinged about the approximate line of flexure of the supporting horizontal portion 20, and the flange 2, as likewise the flange 1, are curved on this approximate radius. The strip as a whole is thereby made to resemble a molding strip.

The seal may be provided with means to anchor the horizontal portion 10 more securely in the wall finish, as is suggested by the keys 19, which are struck up from the metal of the strip. The faces of the upright flanges 1 and 2 are of thin material, and their joining edge leaves no appreciable line of demarcation, yet the line may be somewhat decreased by offsetting the lower edge of the flange 2, as is indicated at 22.

As will now be evident, at installation, after the tub is installed, the strip as a whole which forms the seal is pressed downwardly against the tub, forcing the flange 2 generally upwardly about the line of flexure of the portion 20, so that it is well retracted behind the flange 1. The strip is then nailed to the wall as by the nails 3. The plaster is then placed, and the portion 12 of the flange 1 serves as a screed. As settlement occurs, that is, when there arises a tendency for the tub rim 80 to separate from the terminal edge 93 of the plaster, instead of an actual crack appearing, the flexed portion 20, by its resilience, forces downwardly the upright flange 2, and the latter follows the tub rim downwardly, while the flange 1 remains anchored to the wall finish above. Because of the almost imperceptible line occasioned by the thickness of the flange 1 the joint is unnoticeable, whether the wall finish and tub are widely separated or are closely spaced together.

In particular it will be noted that there is no upwardly directed crack into which condensation can fall or into which water can run. On the contrary, if water should in any way find its way between the flanges 1 and 2, the tendency is for it to drain out again.

The form shown in Figure 2 is very similar except that the flanges 1' and 2' are in this form precisely vertical, and flush with the surface of the wall finish above. Likewise, in order to assist the flange 2' in following downwardly the settlement of the tub rim 80 by the resilience of the portion 20', putty or like material, indicated at 4, may be placed behind the flange 2'.

In Figure 3, instead of forming the seal of one piece of sheet metal, it is formed instead of two separate pieces, to define the flanges 1" and 2" having the respective horizontal portions at 10" and 20". The portion 10" is provided with a downwardly directed steadying flange at its rear edge, as is indicated at 13, which may even be deep enough to constitute the rear flange of an enclosing channel. The portion 20" is provided with an upturned flange 23. Instead of these flanges being complete and uninterrupted, they may be merely lugs or ears turned upwardly at intervals, and certain of these ears may be turned upwardly as indicated at 11", to provide nailing ears.

The two strips in this form are preferably held together permanently, as by rivets 5, which are received in the flange 1", and which slide freely in vertical slots 24 in the flange 2". Since the two pieces of the seal are separate and independent, their flanges may not react from one another by the resilience of the metal itself, as in the forms of Figures 1 and 2, and, as a substitute, for the purpose of urging the flanges resiliently apart I have shown a sinuous spring 6, riveted at 60 to one of the elements, as 10', and bearing upon the portion 20" of the other piece.

The form shown in Figure 4 for resiliently urging the flanges apart provides spring means supplementing the mere resilience of the whole of the sheet metal itself, in the form of upstruck spring tongues 25, formed in the portion 20''', and bearing against the portion 10'''. Nailing ears 11'''' are likewise struck out of the strip, as are also the plaster ears 19'''. The downwardly directed flanges 1''' and 2''' are shown as slightly curved, and in this form the flange 2''' is provided with an outwardly curved toe 26.

The description has emphasized a single (and important) use for the invention, but it may also be used as a baseboard or the like. The upright flanges may be of any height, as may be required by the particular use for which the seal is adapted. It may be installed as a baseboard before it is known whether or not linoleum will be used as a floor covering. Without removal, merely by forcing upwardly the toe of the flange 2, which in such a case has been left purposely with some free movement, the edge of the floor covering when installed may be slid beneath the baseboard, and will always be held tightly.

What I claim as my invention is:

1. In a joint between a wall and a surface at an angle thereto, a self-closing seal comprising a strip of metal folded along its central portion, the strip portions on opposite sides of the fold being formed as nesting Z-bar portions, the folded portion of the strip constituting corresponding and interconnected flanges of the nesting Z-bar portions, the webs of the Z-bar portions being spaced apart, and the other flanges of the Z-bar portions being disposed in closely overlapping relationship and including free edges, the free edge flange of the outer Z-bar portion being disposed substantially in continuation of the wall and the free edge flange of the inner Z-bar portion being disposed in edgewise abutment with such surface.

2. In a joint between a wall and a surface at an angle thereto, a self-closing seal comprising a strip-like element, including a flange extending generally in continuation of the wall face toward said surface to a distance approximating the initial spacing between the wall and the surface, having a web of a width substantially equal to the thickness of the wall facing, and having a portion perpendicular to said web and joined to the side thereof remote from said flange and secured to the backing structure of the wall to maintain said web and flange stationary, a cooperating strip-like element closely underlying and projected beyond said first element flange and into engagement with such surface, and resilient means reacting between said two strip-like elements and urging the underlying element into a position projecting beyond the first element flange, while said first element flange remains stationary always into abutment with such surface as the surface tends to move parallel to the wall owing to shrinkage, settlement, and the like.

3. In a joint between a wall and a surface at an angle thereto, a self-closing seal comprising strip-like inner and outer nesting elements of generally angle shape, a flange of the outer angle element being exposed and closely overlapping the corresponding flange of the inner angle element, said inner angle flange abutting such surface and said outer angle flange extending toward said surface substantially in continuation of the wall face, resilient means reacting between said angle elements constantly urging said inner angle flange into a position with its edge projecting beyond said outer angle flange always into edgewise abutment with such surface, the other side of said outer angle element being of a width substantially equal to the thickness of the wall facing and having on its edge, remote from said outer element flange, flat tab means parallel to said flange, extending in the direction opposite thereto and secured to the backing structure of the wall behind its facing, thus maintaining said outer element stationary.

4. A self-closing seal for a joint between a wall and a surface disposed at an angle thereto, comprising strip-like inner and outer nesting elements of generally angle shape, means operable to anchor said outer angle element stationary with its flange exposed and closely overlapping the corresponding flange of the inner angle element, said inner angle flange being adapted to abut such surface when said outer angle flange extends toward said surface substantially in continuation of the wall face, means positively interconnecting said inner and outer elements to retain them in such nesting relationship and to maintain said flanges closely overlapping, and resilient means reacting between said angle elements constantly urging said inner angle flange to project its edge beyond said outer angle flange always into edgewise abutment with such surface.

5. A self-closing seal for a joint between a wall and a surface disposed at an angle thereto, comprising separate inner and outer nesting strips of sheet metal, each of generally angle shape, a flange of the outer element being exposed and closely overlapping the corresponding flange of the inner angle element, means directly connecting such overlapping flanges for relative sliding movement, to permit abutment of the inner angle flange with such surface when said outer angle flange extends toward such surface substantially in continuation of the wall face, and resilient means reacting between said angle elements, constantly urging said inner angle flange thus to project beyond said outer angle flange into edge abutment with such surface.

6. In a joint between a wall and a surface at an angle thereto, a self-closing seal comprising a first element having a flange extending generally in continuation of the wall toward such surface, a second element having a flange received closely behind and projected edgewise beyond said first element flange and engaging such surface, resilient means interconnecting said first element and said second element and urging said second element flange in a direction to project beyond the flange of said first element, to press constantly into firm contact with such surface, and resilient means interconnecting said second element and its flange and acting to produce a transverse component generally perpendicular to said first element flange, and constantly urging said second element flange toward said first element flange.

7. In a joint between a wall finish and a generally horizontal surface subject to movement parallel to the wall, a self-closing seal comprising a strip of spring-like folded sheet metal, a flange thereon at one side of the folded portion disposed flush with the terminal edge of the wall finish and projecting only in the direction away from such edge, and a flange thereon at the other side of the folded portion pressed, solely by the resilience of the strip, against such surface and following its movement relative to the wall finish, both of said flanges and said folded portion being devoid of means for positive connection with such surface, such flanges overlapping in face-to-face relation, and mutually cooperating to define a substantially continuous surface adapted to extend in upright position across the gap between such terminal edge of the wall finish and such horizontal surface, and means supporting said folded portion adjacent to the terminal edge of the wall finish, and the folded portion carrying said flanges for relative edgewise sliding movement effected solely by the resilience of the strip, to close such gap regardless of the extent of such movement, within limits.

8. In a joint between a wall and a surface at an angle thereto, a self-closing seal comprising a strip including an inner edge portion having unsecured engagement with such surface, an outer edge portion overlapping said inner edge portion disposed generally in continuation of the wall, and a resilient connecting portion joining said inner and outer edge portions, continually urging them edgewise toward non-overlapping relationship, and constituting the sole means for preserving firm engagement of said inner edge portion with such surface.

9. In a joint between a wall and a surface at an angle thereto, a self-closing seal comprising a strip including a flange having unsecured contact with such surface, a second edge flange closely overlapping said first flange and disposed generally in continuation of the wall and projecting toward such surface, two webs joined respectively to said flanges, and a portion of the strip interconnecting said two webs to dispose them in relationship converging toward said flanges when the free edge of the first flange is projecting slightly beyond the free edge of the second flange, the web joined to said first flange being of resilient material urging such web toward parallelism with the other flange, tending to dispose the edge of the inner flange projected a substantial distance beyond the edge of the overlapping flange, and constituting the sole means for preserving tight contact between said first flange and such surface.

10. In a joint between a well and a surface at an angle thereto, a self-closing seal comprising a strip including a flange engaged with such surface, a second edge flange closely overlapping said first flange and extending in the same direction disposed generally in continuation of the wall and projecting toward such surface, and a section interconnecting such two flanges in such relationship and including a resilient portion urging said first flange to project beyond said second flange into contact with such surface, and a single folded portion disposed substantially parallel to said flanges and projecting in the direction opposite the projection of said flanges, and having apertures receiving nailing elements therethrough constituting a support securing said strip to the backing structure of the wall.

11. A self-closing seal for a joint between a wall and a surface disposed at an angle thereto, comprising a strip having a curved flange adapted for edge contact with such surface, a second flange curved similarly to and overlapping said first flange for disposition generally in continuation of the wall and projecting towards said surface, and a portion of the strip interconnecting said two flanges to hold them in such overlapping relationship and maintaining said second flange stationary, said interconnecting strip portion including a yieldable part disposed generally radially of said curved edge flanges and guiding said first flange for arcuate swinging relative to said second flange while preserving its closely overlapping relationship to said first flange, said yieldable part further being resilient to effect such swinging of said first flange for projection beyond said second flange.

12. A self-closing seal for a joint between a wall and a surface disposed at an angle thereto, comprising a strip including inner and outer flange portions disposed in closely overlapping relationship for edgewise projection of the free edge of said inner flange portion beyond the free edge of said outer flange portion, two web portions joined respectively to said flange portions, and an interconnecting portion joining the edges of said web portions remote from said flange portions, said interconnecting portion being of sufficient extent to space apart the edges of said web portions joined thereto to dispose said web portions in relationship converging toward said flange portions when the free edge of said inner flange portion is projected edgewise slightly beyond the free edge of said outer flange portion, and means operable to swing the web portion connected to said inner flange portion toward parallelism with the other web portion, thereby simultaneously projecting the free edge of said inner flange portion beyond the free edge of said outer flange portion and moving the inner flange portion toward the outer flange portion.

13. A self-closing seal for a joint between a wall and a surface disposed at an angle thereto, comprising a strip of metal folded along its central portion, the strip portions on opposite sides of the fold being formed as nesting Z-bar portions, the folded portion of the strip constituting corresponding and interconnected flanges of the nesting Z-bar portions, the webs of the Z-bar portions being spaced apart, and the other flanges of the Z-bar portions being disposed in closely overlapping relationship and curved on a radius substantially about the junction between the web of the inner Z-bar portion and its flange of the folded portion, and including free edges, the free edge flange of the outer Z-bar portion being adapted for disposition substantially in continuation of the wall and the free edge flange of the inner Z-bar portion in edgewise abutment with such surface, the inner Z-bar web being of resilient material and tending to dispose the free edge flange of the inner Z-bar portion projected a substantial distance beyond the free edge flange of the outer Z-bar portion.

ALBERT P. ROBINSON.